(12) United States Patent
Aubin

(10) Patent No.: US 8,448,877 B1
(45) Date of Patent: May 28, 2013

(54) VEHICLE TRACTION MAT AND ASSOCIATED METHOD

(76) Inventor: Gary A. Aubin, Lyndhurst, NJ (US)

( * ) Notice: Subject to any disclaimer, the term of this patent is extended or adjusted under 35 U.S.C. 154(b) by 328 days.

(21) Appl. No.: 12/856,289

(22) Filed: Aug. 13, 2010

Related U.S. Application Data

(60) Provisional application No. 61/233,536, filed on Aug. 13, 2009.

(51) Int. Cl.
   *E01B 23/00* (2006.01)
(52) U.S. Cl.
   USPC ............................................. 238/14
(58) Field of Classification Search
   USPC ............................................ 238/14; 152/208
   See application file for complete search history.

(56) References Cited

U.S. PATENT DOCUMENTS

| | | | | |
|---|---|---|---|---|
| 1,863,316 A | * | 6/1932 | Webster, Jr. | .................... 238/14 |
| 4,121,765 A | | 10/1978 | Fosteris | |
| 4,210,280 A | | 7/1980 | Reisner | |
| 4,223,835 A | * | 9/1980 | Witt et al. | ........................ 238/14 |
| 5,204,159 A | * | 4/1993 | Tan | ................................ 428/143 |
| 5,833,136 A | | 11/1998 | Japp | |
| 6,394,362 B1 | * | 5/2002 | Kramr | .............................. 238/14 |
| D464,304 S | * | 10/2002 | Wright | .......................... D12/203 |

* cited by examiner

*Primary Examiner* — S. Joseph Morano
*Assistant Examiner* — Zachary Kuhfuss

(57) ABSTRACT

A vehicle traction mat may include a flexible and unitary body having a central portion. A first and second ramp may be connected to axially opposed first and second ends of the central portion. A tread layer may be positioned on a top surface of the central portion and terminating prior to reaching the first and second ramps. A plurality of first studs may be statically attached to a top surface of the body and protruding upwardly from the central portion such that a top most tip of each of the first studs penetrates out through the tread layer and terminates above the tread layer. A plurality of second studs may be statically attached to the central portion and protruding downwardly therefrom. The body may be selectively rolled and unrolled between cylindrical and planar shapes during non-operating and operating conditions respectively.

13 Claims, 5 Drawing Sheets

VEHICLE TRACTION MAT AND ASSOCIATED METHOD

CROSS REFERENCE TO RELATED APPLICATIONS

This application claims the benefit of U.S. Provisional Application No. 61/233,536, filed Aug. 13, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle traction mats and, more particularly, to a vehicle traction mat and associated method for providing vehicle operators with an easy and convenient mechanism of providing additional traction to the tires of a vehicle stuck in snow, mud and the like.

2. Prior Art

Traction mats have been used by automobile vehicles for many years to enable the vehicle to be driven out of a rut or pothole by gaining additional traction from materials placed into the path of the drive wheel. Numerous such means have been used by persons stuck in ice or snow, including sand, ashes, boards, burlap bags, pieces of carpeting, tire chains, expanded metal and the like. Such makeshift means are generally ineffective, being immediately caught and thrown out by the rotating traction wheels, subjecting bystanders to possible injury from the flying objects. In addition, the prior art is replete with mats having indentations in their surface, mats formed of various materials, including sheet metal with openings or indentations formed therein, and, in some cases, studs have been fastened to the mat. Such devices of the prior art have proven unsatisfactory for numerous reasons, including being overly expensive to manufacture, unsafe to handle because of sharp edges, etc., snow or mud being packed between the protuberances on the mat causing loss of traction.

One prior art example shows a traction mat that has a plurality of pins captivated in a resilient mat, each pin having a head on each of the opposing ends, and a washer between the head and the mat. The mat provides increased traction to a vehicle stuck in snow and the like by seizing both the tire and the ground with the heads of each pin in pivotal action, as the washer pivots and locks the heads in a gripping position for the increased traction. A rigid steel start plate of a width less than the width of the tire is attached to one end of the mat for providing initial impetus to position the mat under the tire. Although effective in concept, the above noted invention is overly complicated in design, making it prohibitively expensive for mass production and general consumer acceptance. Furthermore, once on the mat, there is no provision for guiding the wheel of the vehicle along a further course down the mat's surface, which could lead to the wheel slipping off of the mat and losing traction once more.

Accordingly, a need remains for a vehicle traction mat and associated method in order to overcome the above-noted shortcomings. The present invention satisfies such a need by providing a traction mat that is convenient and easy to use, is durable yet lightweight in design, and provides users with a simple yet effective method to prevent their vehicles from becoming hopelessly stuck in snow, on ice, in mud, sand or any place one's vehicle tires are spinning.

BRIEF SUMMARY OF THE INVENTION

In view of the foregoing background, it is therefore an object of the present invention to provide an apparatus for providing vehicle tire traction on a slippery surface. These and other objects, features, and advantages of the invention are provided by a vehicle traction mat.

The vehicle traction mat may include a flexible and unitary body preferably having a central portion. A first ramp and a second ramp may be connected to axially opposed first and second ends of the central portion. A tread layer may be positioned on a top surface of the central portion and terminating prior to reaching the first and second ramps. A plurality of first studs may be statically attached to a top surface of the body and protruding upwardly from the central portion such that a top most tip of each of the first studs penetrates out through the tread layer and terminates above the tread layer. A plurality of second studs may be statically attached to the central portion and protruding downwardly therefrom such that a bottom most tip of each of the second stubs penetrates out through a bottom surface of the body.

The body may be selectively rolled and unrolled between cylindrical and planar shapes during non-operating and operating conditions respectively. Such an arrangement provides the unexpected and unpredicted advantage of preventing vehicles from becoming stuck in snow, on ice, in mud, sand or any soft ground where the vehicle's tires may invariably spin without traction. The apparatus may further be easily rolled and stored in its own mesh storage bag thus allowing users to stow away the apparatus in a vehicle's trunk or under the seat when not in use. The apparatus thus eliminates the need to carry space wasting shovels, boards, chains, or sand bags in a vehicle when driving on off-road conditions or on highways in winter.

The first and second studs may be monolithically formed with the body in such a manner that the second studs remain spaced subjacent to the first studs and the tread layer respectively. A plurality of raised side-walls may extend upwardly from oppositely situated longitudinal edges of the central portion. The side-walls may further be equidistantly offset from a centrally registered longitudinal axis of the central portion and extend parallel to the longitudinal axis along an entire longitudinal length of the central portion. The tread layer may further be raised above a top surface of the central portion and remains statically seated between the side-walls. Such an arrangement provides the unexpected and unpredicted advantage of providing much needed traction for the vehicle tires as well as ensuring that the vehicle types rotate on the surface of the body of the traction mat without being able to slip off when in use.

Each of the first and second studs may be juxtaposed along top and bottom surfaces of each of the first and second ramps respectively. The first and second ramps may further be monolithically formed with the central portion and have a respective width equal to a width of the central body. Such an arrangement provides the unexpected and unpredictable advantage of ensuing that the traction for the vehicle tires is covered in the entire area of the traction mat. In this way, the vehicle tire may be able to roll onto the first studded ramp without slipping before moving onto the body of the traction mat.

The first and second studs are oriented perpendicular to the top and bottom surfaces of the body respectively. This arrangement provides the unexpected and unpredictable advantage of maximizing the grip on the tires with the first studs while the second studs grip the snow, on ice, in mud, sand or any soft ground efficiently without slippage.

The invention may include a method of utilizing a vehicle traction mat for providing vehicle tire traction on a slippery surface. Such a method may include the chronological steps of: providing a flexible and unitary body preferably having a central portion as well as first and second ramps connected to axially opposed first and second ends of the central portion; providing and positioning a tread layer on a top surface of the central portion wherein the tread layer terminates prior to reaching the first and second ramps; providing and statically attaching a plurality of first studs to a top surface of the body wherein the first studs protrude upwardly from the central portion; penetrating a top most tip of each of the first studs out through the tread layer such that the first studs terminate above the tread layer; providing and statically attaching a plurality of second studs to the central portion wherein the second studs protrude downwardly from the central portion; penetrating a bottom most tip of each of the second stubs out through a bottom surface of the body; and selectively rolling and unrolling the body between cylindrical and planar shapes during non-operating and operating conditions respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
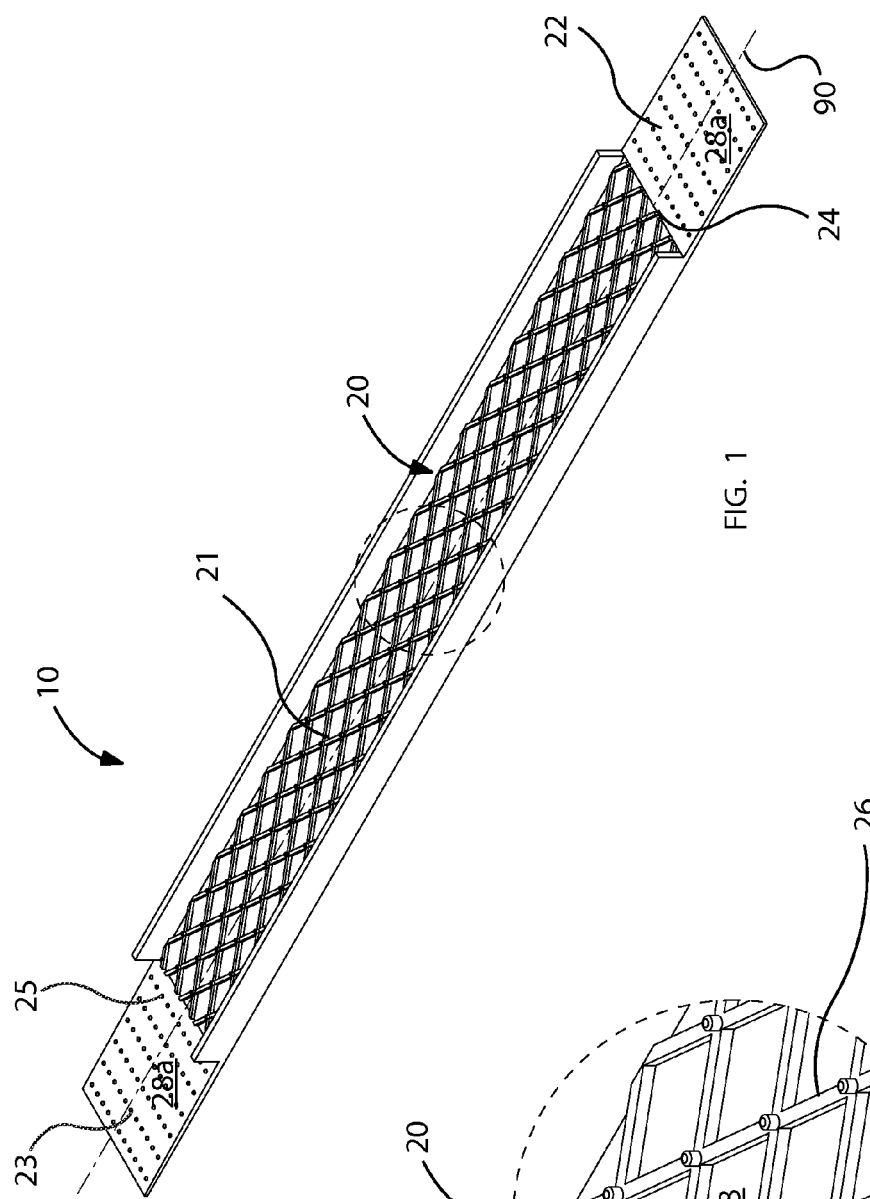
FIG. 1 is a top perspective view showing a vehicle traction mat, in accordance with the present invention.
Figure 2:
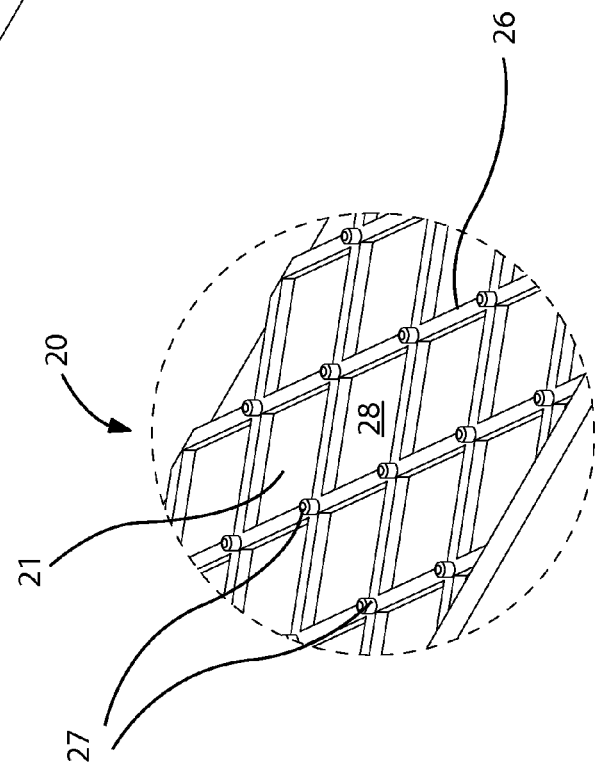
FIG. 2 is an enlarged partial view showing the studs protruding upwardly from a top surface of the raised rubber traction strips.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-8 by the reference numeral 10 and is intended to provide a vehicle traction mat. It should be understood that the vehicle traction mat 10 may be used to provide vehicle tire traction on many different types of slippery ground surfaces such as ground surfaces covered with snow, ice, mud and/or sand, for example.

Referring generally to FIGS. 1-8, the vehicle traction mat 10 may include a flexible and unitary body 20 preferably having a central portion 21. Such a body 20 may have a resilient shape that is produced of heavy-duty reinforced treaded material, such as rubber or other well-known resilient materials in the industry. Advantageously, the body 20 may be selectively rolled and unrolled between cylindrical and planar shapes during non-operating and operating conditions respectively. In this manner, the traction mat 10 may be easily rolled and stored in a storage bag 32 thus allowing users to stow away the traction mat 10 in the vehicle's trunk or under the seat when not in use. The traction mat 10 thus eliminates the need to carry space wasting shovels, boards, chains, or sand bags in a vehicle 11 when driving on off-road conditions or on highways in winter.

Figure 3:
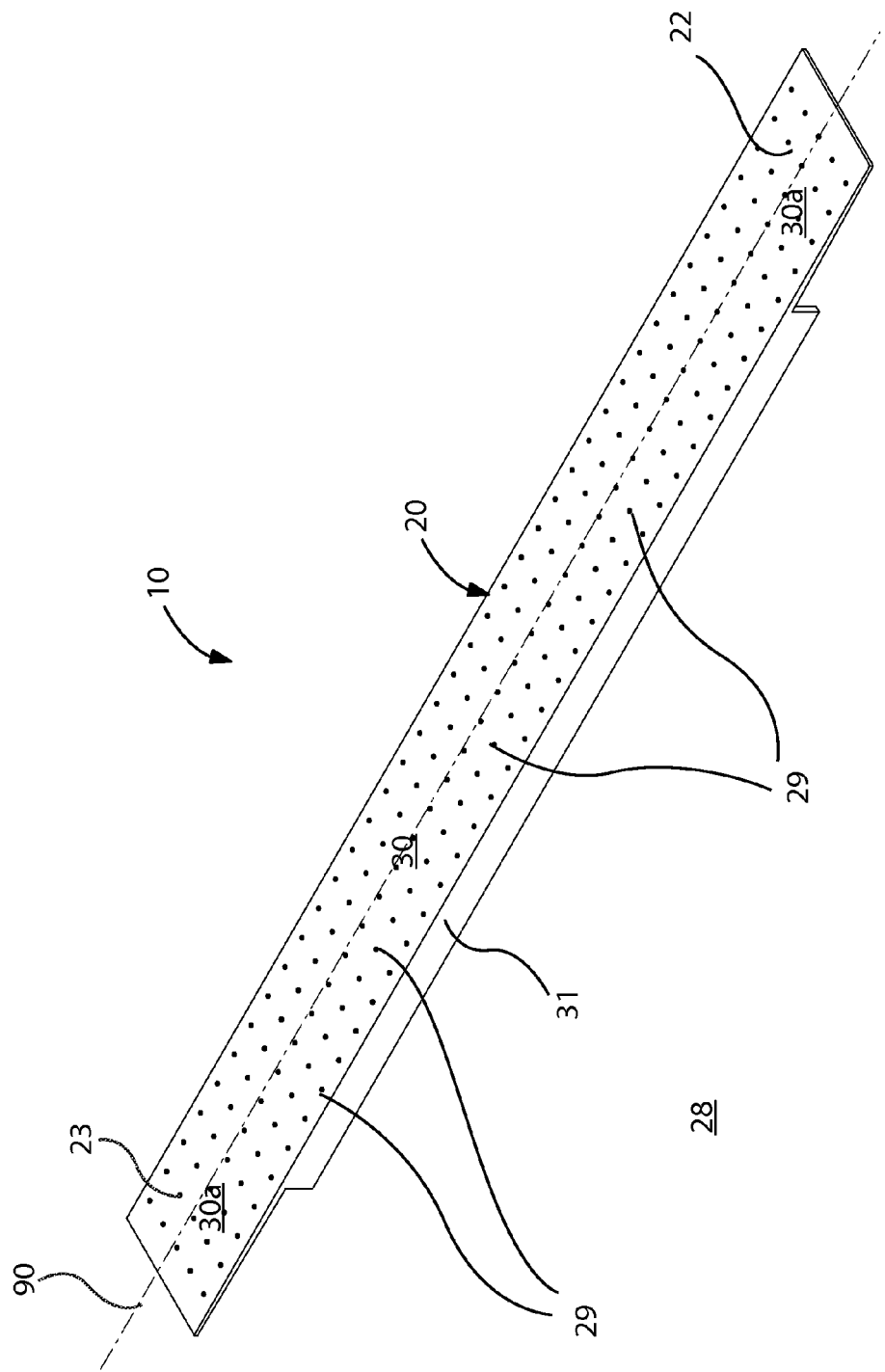
FIG. 3 is a bottom perspective view of the vehicle traction mat shown in FIG. 1.
Figure 4:
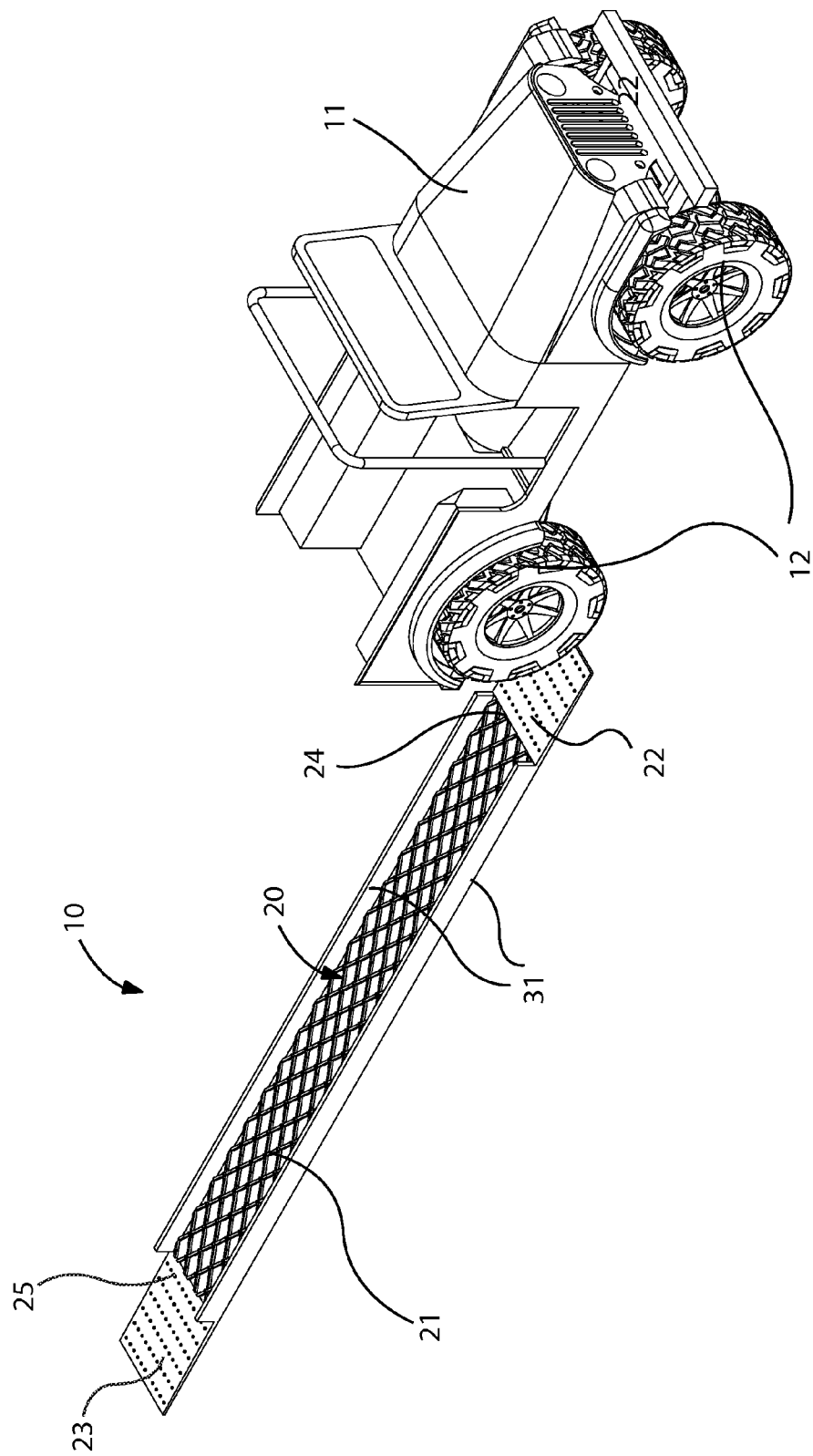
FIG. 4 is a perspective view showing the vehicle traction mat in an exemplary environment.
Figure 6:
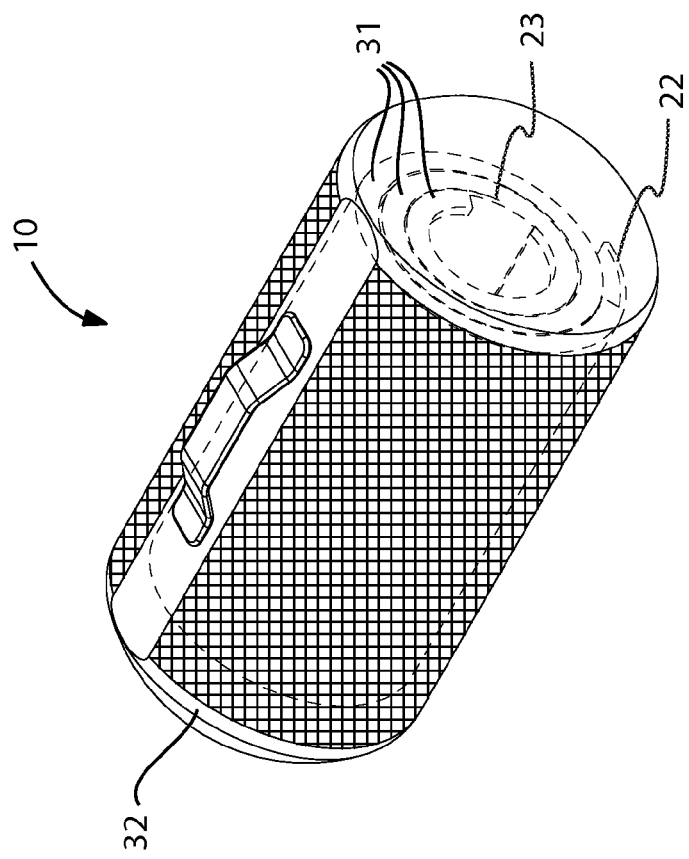
FIG. 6 is a perspective view of the vehicle traction mat positioned in a meshed carry bag.
Figure 5:
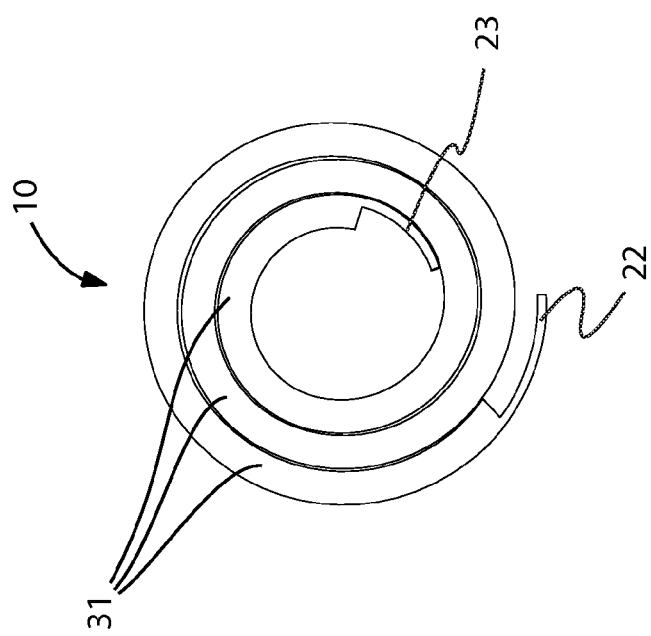
FIG. 5 is a perspective view of the vehicle traction mat in a rolled position for storage.
Figure 8:
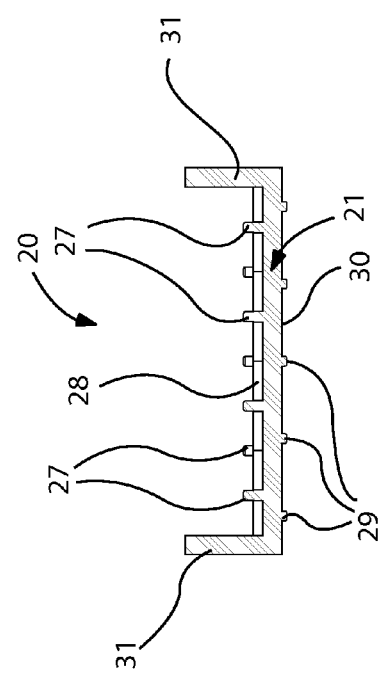
FIG. 8 is an enlarged cross-sectional view taken along line 8-8 shown in FIG. 7.

As perhaps best shown in FIGS. 1, 3 and 8, raised walls 31 are monolithically formed along each longitudinal edge of the body 20, which may extend approximately 1 to 2 inches above the top surface 28 of body 20. Side-walls 31 may be equidistantly offset from a centrally registered longitudinal axis 90 of the central portion 21 and extend parallel to the longitudinal axis 90 along an entire longitudinal length of the central portion 21. The raised side-walls 31 may extend upwardly from oppositely situated longitudinal edges of the central portion 21. Such a structural configuration is essential and advantageous for assisting a driver to keep tires 12 on body 20.

A tread layer 26 may be positioned on top surface 28 of the central portion 21. Such a tread layer 26 may terminate prior to reaching the first and second ramps 22, 23, which is crucial and advantageous for providing reliable traction on snow, ice, mud caked tires and other slippery surfaces. The tread layer 26 may rise above a top surface 28 of the central portion 21 and remain statically seated between the side-walls 31. Such an arrangement provides the unexpected and unpredicted advantage of providing much needed traction for the vehicle tires as well as ensuring the vehicle tires 12 travel along a longitudinal length of body 20 without prematurely slipping off duirng use.

Figure 7:
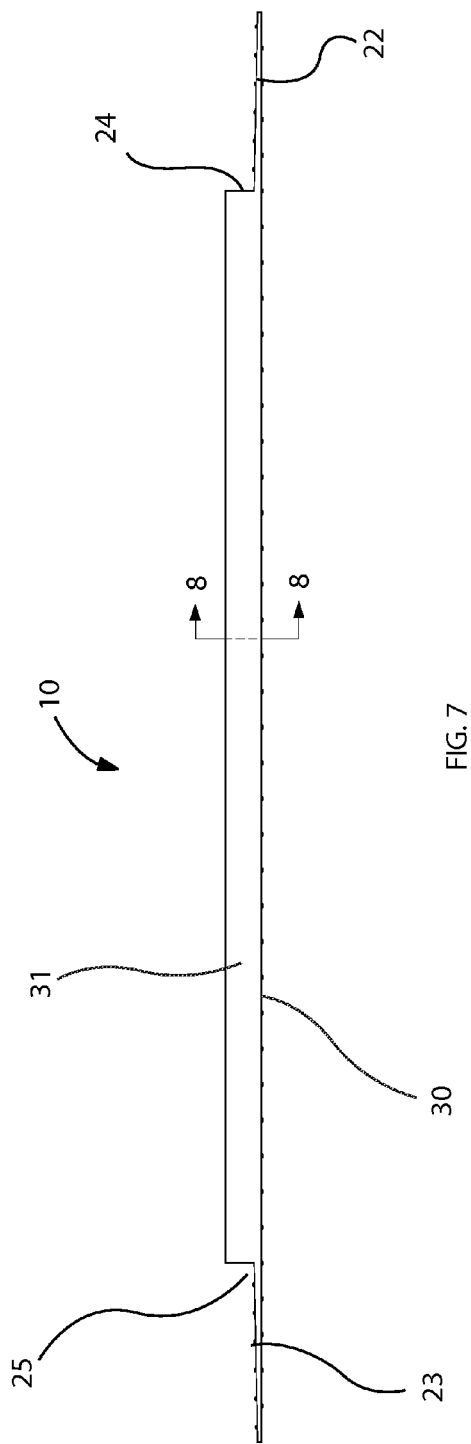
FIG. 7 is a side elevational view of the vehicle traction matt shown in FIG. 1.

As perhaps best shown in FIGS. 1, 3 and 7, a first ramp 22 and a second ramp 23 may be connected to axially opposed first and second ends 24, 25 of the central portion 21. Such inclined ramps 22, 23 may be formed at each longitudinally opposed end 24, 25 of the body 20. Each inclined ramp 22, 23 may have a stainless steel studded top surface 28a that is important for receiving tire 12 and providing traction. Each ramp 22, 23 may measure 3 to 5 inches in length, for example. Of course, the traction mat 10 may be produced in a variety of sizes, suitable for compact cars and SUV's, vans, or light trucks, as is obvious to a person of ordinary skill in the art.

Referring to FIGS. 1-4 and 7-8, a plurality of first studs 27 may be statically attached to a top surface 28 of body 20 and protrude upwardly from the central portion 21 such that a top most tip of each of the first studs 27 penetrates out through the tread layer 26 and terminates above the tread layer 26. With the top most tip of the studs 27 exposed on the top surface 28, vehicle tire traction is increased. A plurality of second studs 29 may be statically attached to the central portion 21 and protrude downwardly therefrom such that a bottom most tip of each of the second studs 29 penetrates out through a bottom surface 30 of the body 20. Such a second studs 29 is also exposed on the bottom surface 30 of the body 20, which is vital so that body 20 advantageously does not slip out from under the tires 12.

In one embodiment, the first and second studs 27, 29 may be monolithically formed with the body 20 in such a manner that the second studs 29 remain spaced subjacent to the first studs 27 and the tread layer 26 respectively.

Referring now to FIGS. 1, 3 and 7, each of the first and second studs 29 may be juxtaposed along top and bottom surfaces 28a, 30a of each of the first and second ramps 22, 23 respectively. Such first and second ramps 22, 23 may be monolithically formed with the central portion 21 and have a respective width equal to a width of the central portion 30. Such a structural arrangement provides the unexpected and unpredictable advantage of ensuring the vehicle tire 12 traction is guided along the entire area of the central body 20. In this way, the vehicle tires 12 are able to roll onto the studded first ramp 22 without slipping before moving onto the central portion 30 of body 20 of the traction mat 10. Such a characteristic of body 20 provides the unexpected and unpredicted advantage of preventing a vehicle 11 from becoming stuck in snow, on ice, in mud, sand or any soft ground where the vehicle tires 12 may spin without traction.

Referring now to FIGS. 7 and 8, one embodiment illustrates first and second studs 29 oriented perpendicularly to the top and bottom surfaces 28, 30 of the body 20 respectively. This arrangement provides the unexpected and unpredictable advantage of maximizing the grip on the tires 12 with the first studs 27 while the second studs 29 grip the snow, ice, mud, sand or any soft ground efficiently without slippage.

The invention may further include a method of utilizing a vehicle traction mat 10 for providing vehicle tire traction on a slippery surface. Such a method may include the chronological steps of: providing a flexible and unitary body 20 preferably having a central portion 21 as well as first and second ramps 22, 23 connected to axially opposed first and second ends 24, 25 of the central portion 21; providing and positioning a tread layer 26 on a top surface 28 of the central portion 21 wherein the tread layer 26 terminates prior to reaching the first and second ramps 22, 23.

Such a method may further include the chronological steps of: providing and statically attaching a plurality of first studs 27 to a top surface 28 of the body 20 wherein the first studs 27 protrude upwardly from the central portion 21; penetrating a top most tip of each of the first studs 27 out through the tread layer 26 such that the first studs 27 terminate above the tread layer 26; providing and statically attaching a plurality of second studs 29 to the central portion 21 wherein the second studs 29 protrude downwardly from the central portion 21; penetrating a bottom most tip of each of the second stubs 29 out through a bottom surface 30 of the body 20; and selectively rolling and unrolling the body 20 between cylindrical and planar shapes during non-operating and operating conditions respectively.

As a non-limiting example, the traction mat 10 may be provided with embossed lettering saying "Top Side". The inclined ramps 22, 23 may be approximately 3 to 5 inches in length so tires 12 can be rolled onto central portion 30 from either end of body 20. The traction mat 10 provides consumers with a simple yet effective apparatus and method to prevent their vehicle from becoming hopelessly stuck in snow, on ice, in mud, sand or other surfaces on which vehicles tire loose traction. Eliminating the need to wait for costly tow trucks. This practical product would allow motorists to enjoy an extra measure of confidence when traveling in inclement weather, and in isolated areas, where there is no help around, especially when driving alone.

As a non-limiting example, the vehicle traction mat 10 is simple and straightforward to operate. First, a user may position body 20 beneath the stuck tire 12 using the inclined studded ramps 22, 23 to gain initial access to the tire's treads and to provide traction thereto. Next, the user may turn on the vehicle 11 and slowly drive in the direction along central portion 30, gaining traction form the studs 27, 29 in combination with tread layer 26 and guidance from sidewalls 31. Once the vehicle 11 is driven out of the slippery terrain, the user can roll-up the traction mat 10 and store same in the vehicle's trunk or beneath the seat until needed again.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A vehicle traction mat for providing vehicle tire traction on a slippery surface, said vehicle traction mat comprising:
    a body having a central portion as well as first and second ramps connected to said central portion;
    a tread layer positioned on a top surface of said central portion and terminating prior to reaching said first and second ramps;
    a plurality of first studs attached to a top surface of said body and protruding upwardly from said central portion such that a top most tip of each of said first studs penetrates out through said tread layer and terminates above said tread layer; and
    a plurality of second studs attached to said central portion and protruding downwardly therefrom such that a bottom most tip of each of said second studs penetrates out through a bottom surface of said body;
    wherein said body is selectively rolled and unrolled between cylindrical and planar shapes during non-operating and operating conditions respectively;
    wherein said first and second studs are monolithically formed with said body in such a manner that said second studs remain spaced subjacent to said first studs and said tread layer respectively.

2. The vehicle traction mat of claim 1, further comprising: a plurality of raised side-walls extending upwardly from oppositely situated longitudinal edges of said central portion, said side-walls being equidistantly offset from a centrally registered longitudinal axis of said central portion and extending parallel to the longitudinal axis along an entire longitudinal length of said central portion.

3. The vehicle traction mat of claim 2, wherein said tread layer is raised above a top surface of said central portion and remains statically seated between said side-walls.

4. The vehicle traction mat of claim 1, wherein each of said first and second studs are juxtaposed along top and bottom surfaces of each of said first and second ramps respectively.

5. The vehicle traction mat of claim 1, wherein said first and second ramps are monolithically formed with said central portion and have a respective width equal to a width of said central body.

6. The vehicle traction mat of claim 1, wherein said first and second studs are oriented perpendicular to said top and bottom surfaces of said body respectively.

7. A vehicle traction mat for providing vehicle tire traction on a slippery surface, said vehicle traction mat comprising:
    a flexible and unitary body having a central portion as well as first and second ramps connected to axially opposed first and second ends of said central portion;
    a tread layer positioned on a top surface of said central portion and terminating prior to reaching said first and second ramps;
    a plurality of first studs statically attached to a top surface of said body and protruding upwardly from said central portion such that a top most tip of each of said first studs penetrates out through said tread layer and terminates above said tread layer; and
    a plurality of second studs statically attached to said central portion and protruding downwardly therefrom such that a bottom most tip of each of said second studs penetrates out through a bottom surface of said body;
    wherein said body is selectively rolled and unrolled between cylindrical and planar shapes during non-operating and operating conditions respectively;
    wherein said first and second studs are monolithically formed with said body in such a manner that said second studs remain spaced subjacent to said first studs and said tread layer respectively.

8. The vehicle traction mat of claim 7, further comprising: a plurality of raised side-walls extending upwardly from oppositely situated longitudinal edges of said central portion, said side-walls being equidistantly offset from a centrally registered longitudinal axis of said central portion and extending parallel to the longitudinal axis along an entire longitudinal length of said central portion.

9. The vehicle traction mat of claim 8, wherein said tread layer is raised above a top surface of said central portion and remains statically seated between said side-walls.

10. The vehicle traction mat of claim 7, wherein each of said first and second studs are juxtaposed along top and bottom surfaces of each of said first and second ramps respectively.

11. The vehicle traction mat of claim 7, wherein said first and second ramps are monolithically formed with said central portion and have a respective width equal to a width of said central body.

12. The vehicle traction mat of claim 7, wherein said first and second studs are oriented perpendicular to said top and bottom surfaces of said body respectively.

13. A method of utilizing a vehicle traction mat for providing vehicle tire traction on a slippery surface, said method comprising the chronological steps of:
    providing a flexible and unitary body having a central portion as well as first and second ramps connected to axially opposed first and second ends of said central portion;

providing and positioning a tread layer on a top surface of said central portion wherein said tread layer terminates prior to reaching said first and second ramps;

providing and statically attaching a plurality of first studs to a top surface of said body wherein said first studs protrude upwardly from said central portion; penetrating a top most tip of each of said first studs out through said tread layer such that said first studs terminate above said tread layer;

providing and statically attaching a plurality of second studs to said central portion wherein said second studs protrude downwardly from said central portion;

penetrating a bottom most tip of each of said second stubs out through a bottom surface of said body; and selectively rolling and unrolling said body between cylindrical and planar shapes during non-operating and operating conditions respectively;

wherein said first and second studs are monolithically formed with said body in such a manner that said second studs remain spaced subjacent to said first studs and said tread layer respectively.

\* \* \* \* \*